(12) United States Patent
Dhaundiyal et al.

(10) Patent No.: US 10,489,487 B2
(45) Date of Patent: Nov. 26, 2019

(54) METHODS AND DEVICES TO SELECT PRESENTATION MODE BASED ON VIEWING ANGLE

(71) Applicant: Microsoft Technology Licensing, LLC, Redmond, WA (US)

(72) Inventors: Rahul Dhaundiyal, Hyderabad (IN); Harish Dhawan, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/874,537

(22) Filed: Jan. 18, 2018

(65) Prior Publication Data

US 2019/0220500 A1    Jul. 18, 2019

(51) Int. Cl.
*G06F 17/00* (2019.01)
*G06F 17/21* (2006.01)
*G06F 3/01* (2006.01)
*G06F 3/048* (2013.01)
*G06F 9/451* (2018.01)

(52) U.S. Cl.
CPC ............ *G06F 17/212* (2013.01); *G06F 3/012* (2013.01); *G06F 3/048* (2013.01); *G06F 9/451* (2018.02); *G06F 2203/04803* (2013.01)

(58) Field of Classification Search
CPC ...... G06F 3/017; G06F 3/0416; G06F 3/0304; G06F 3/038; G06F 9/451
See application file for complete search history.

(56) References Cited

U.S. PATENT DOCUMENTS

| 6,571,342 B1* | 5/2003 | Detlef | G06F 1/16 710/304 |
| 2006/0202952 A1* | 9/2006 | Sato | G06F 3/011 345/156 |
| 2009/0315869 A1* | 12/2009 | Sugihara | G06F 1/1605 345/204 |
| 2013/0033485 A1* | 2/2013 | Kollin | G06F 3/0484 345/419 |
| 2014/0118255 A1 | 5/2014 | Billerbeck | |
| 2014/0225931 A1 | 8/2014 | Plagemann et al. | |

(Continued)

OTHER PUBLICATIONS

Zac Bowden, "Intel RealSense SR300 review: Still the best Windows Hello webcam", Sep. 7, 2016, pp. 1-8. (Year: 2016).*

(Continued)

*Primary Examiner* — Ariel Mercado
(74) *Attorney, Agent, or Firm* — Arent Fox LLP

(57) ABSTRACT

Methods and devices for selecting an application layout for presentation of an application on a display of a computer device may include receiving a request to use at least one application executing on the computer device. The methods and devices may include receiving user distance information that identifies a distance a user is from the computer device and calculating a viewing angle by a user of the at least one application based at least upon a screen size of the display and the user distance information. The methods and devices may include comparing the viewing angle to a viewing angle threshold value. The methods and devices may include automatically selecting an application layout from a plurality of predetermined application layouts associated with the at least one application and presenting the at least one application on the display using the application layout.

24 Claims, 5 Drawing Sheets

(56) References Cited

U.S. PATENT DOCUMENTS

| | | | |
|---|---|---|---|
| 2014/0250245 A1* | 9/2014 | Pahud | G06F 13/102 |
| | | | 710/14 |
| 2014/0354531 A1 | 12/2014 | Foreman | |
| 2015/0095815 A1 | 4/2015 | Malkin et al. | |
| 2015/0234558 A1* | 8/2015 | Ichikawa | G06F 3/0481 |
| | | | 715/800 |
| 2015/0309569 A1* | 10/2015 | Kohlhoff | G06F 3/013 |
| | | | 345/156 |
| 2018/0095528 A1* | 4/2018 | Tao | G06F 17/211 |

OTHER PUBLICATIONS

"International Search Report and Written Opinion Issued in PCT Application No. PCT/US18/068094", dated May 16, 2019, 13 Pages.

* cited by examiner

METHODS AND DEVICES TO SELECT PRESENTATION MODE BASED ON VIEWING ANGLE

BACKGROUND

The present disclosure relates to selecting a presentation mode and/or layout of an application and/or website.

Applications may be designed to look or behave differently based on the screen size on which they are displayed. For example, the same website, or an application, may look vastly different on a mobile phone than on a desktop and/or laptop. Such a layout is often called responsive layout that adjusts automatically based on screen size of a device.

However, the same screen may look larger or smaller based on its distance from the viewer. Therefore, a laptop or desktop, if kept far away from the viewer would cast the same viewing angle as a mobile phone in a user's hands. This is often the case with monitors which are placed on display in meeting rooms or galleries. Therefore, maintaining the same user interface layout in such cases may not be optimal.

Thus, there is a need in the art for improvements in selecting a presentation mode and/or layout of an application and/or website.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions, a processor in communication with the memory, and an operating system in communication with the memory and the processor. The operating system may be operable to receive a request to use at least one application executing on the computer device; receive user distance information that identifies a distance a user is from the computer device; calculate a viewing angle by a user of the at least one application based at least upon a screen size of the display and the user distance information; compare the viewing angle to a viewing angle threshold value; and automatically select an application layout from a plurality of predetermined application layouts associated with the at least one application based at least on the comparison of the viewing angle to the viewing angle threshold value and a determined use of the at least one application by the user; and present the at least one application on the display using the application layout.

Another example implementation relates to a method for selecting an application layout for presentation of an application on a display of a computer device. The method may include receiving, at an operating system executing on the computer device, a request to use at least one application executing on the computer device. The method may include receiving user distance information that identifies a distance a user is from the computer device. The method may include calculating a viewing angle by a user of the at least one application based at least upon a screen size of the display and the user distance information. The method may include comparing the viewing angle to a viewing angle threshold value. The method may include automatically selecting an application layout from a plurality of predetermined application layouts associated with the at least one application based at least on the comparison of the viewing angle to the viewing angle threshold value and a determined use of the at least one application by the user. The method may include presenting the at least one application on the display using the application layout.

Another example implementation relates to computer-readable medium storing instructions executable by a computer device. The computer-readable medium may include at least one instruction for causing the computer device to receive a request to use at least one application executing on the computer device. The computer-readable medium may include at least one instruction for causing the computer device to receive user distance information that identifies a distance a user is from the computer device. The computer-readable medium may include at least one instruction for causing the computer device to calculate a viewing angle by a user of the at least one application based at least upon a screen size of the display and the user distance information. The computer-readable medium may include at least one instruction for causing the computer device to compare the viewing angle to a viewing angle threshold value. The computer-readable medium may include at least one instruction for causing the computer device to automatically select an application layout from a plurality of predetermined application layouts associated with the at least one application based at least on the comparison of the viewing angle to the viewing angle threshold value and a determined use of the at least one application by the user. The computer-readable medium may include at least one instruction for causing the computer device to present the at least one application on the display using the application layout.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

This disclosure relates to devices and methods for selecting a presentation mode and/or layout of an application and/or website based on a viewing angle of a device on which the application and/or website is presented. Applications may be designed to look or behave differently based on the screen size on which they are displayed. However, the same screen may look larger or smaller based on its distance from the viewer. In more precise terms, how big an object appears depends on the viewing cone, or the viewing angle that it casts on user's eyes. The same object, when close by looks bigger because it casts a wider viewing angle on the user's eyes. Therefore, a laptop or desktop, if kept far away from the viewer would cast the same viewing angle as a mobile phone in a user's hands. This is often the case with monitors which are placed on display in meeting rooms or galleries. For example, participants usually sit farther away from their screens during video conferencing using Skype, than, say, while drafting an email. Similarly, many users sit in a laid back posture while reading a document, but are much closer to screen when authoring the document. Therefore, maintaining the same user interface layout in such cases may not be optimal.

The devices and methods may have an application automatically switch to an appropriate application layout based on a viewing angle of a device by a user. For example, the desktop application may switch to a mobile phone layout if the viewer is far enough away from the device. In an implementation, the devices and methods may select an application layout of the application based at least on a viewing angle of the user. The viewing angle may be determined based on the distance between the viewer and the screen (inversely proportional) and the size of the screen (directly proportional).

The devices and methods may also have applications use the distance of the user from a device as an input to determine a user's intent for use of the application. For example, if the user is working on a presentation, and the user moves far away from the screen where the user is working on the presentation, the application may use the distance of the user from the screen an input to assume that user is no longer editing the presentation. As such, the application may switch into a presentation mode when the user moves far away from the screen where the user was editing the presentation, and the application may switch to editing mode when the user moves nearby the screen where the user was editing the presentation.

As such, the devices and methods may have applications automatically switch to an appropriate application layout for presentation on a display based on a viewing angle of a device and/or the distance of the user from a device.

Figure 1:
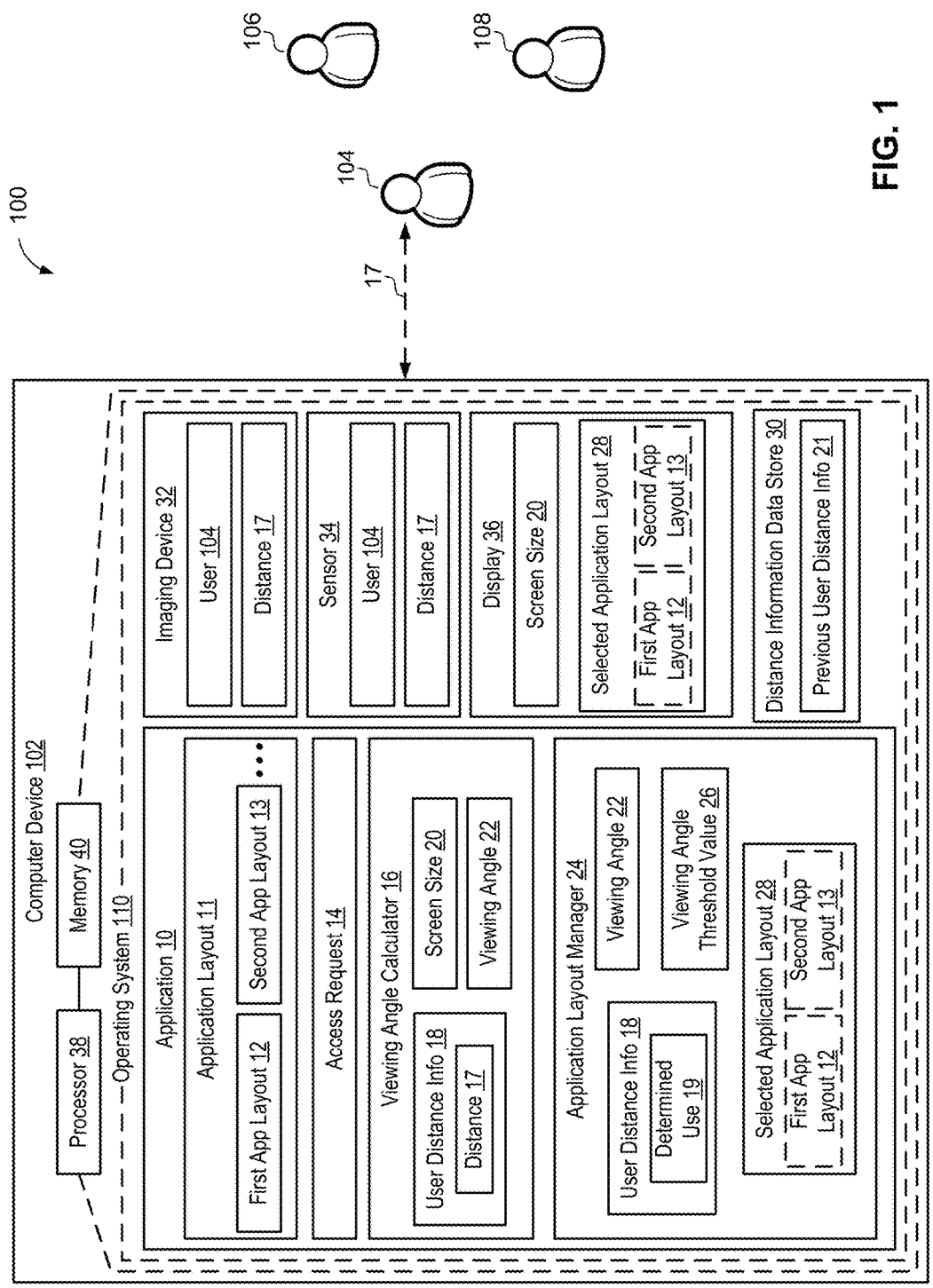
FIG. 1 is a schematic block diagram of an example computer device in accordance with an implementation of the present disclosure.

Referring now to FIG. 1, an example computer device 102 for use with selecting an application layout may include one or more applications 10 that a user 104 may access on computer device 102. Applications 10 may include a plurality of application layouts 11, such as, a first application layout 12 and a second application layout 13 up to n (where n is an integer) application layouts. The application layouts 11 may define how application 10 may be presented on display 36. For example, the application layouts 11 may modify the font size displayed, an image size, orientation of objects presented, an amount of content presented, a type of content presented, and a presentation mode of the application (e.g., mobile phone mode, full screen in a presentation mode, an editing mode). One example may include the application layouts 11 may modify an orientation of objects in the user interface (UI) from horizontal to vertical. For example, a news article shown in multiple columns (where columns are placed side by side horizontally), may collapse into a single vertical column. A multiple column layout may be beneficial when the viewing angle 22 is large (e.g., a desktop) whereas a single column layout may be beneficial when the viewing angle 22 is small (e.g., a mobile device). Another example may include changing an amount of content presented to user 104. For example, only headings may be displayed when user 104 is far away from computer device 102 (e.g., in a presentation mode), and additional content may be revealed when user 104 walks towards the display (e.g., a reading mode).

In an implementation, the application layouts 11 may change based on a viewing angle 22 of computer device 102. For example, a desktop application may switch to a mobile phone layout if the viewer is far enough away from the device. Another example may include images may resize to provide a comfortable viewing angle to the user (e.g., automatically zoom when viewing angle is small). Different applications may have the same and/or different predetermined application layouts 11.

Computer device 102 may include an operating system 110 executed by processor 38 and/or system memory 40 of computer device 102. System memory 40 may be configured for storing data and/or computer-executable instructions defining and/or associated with operating system 110, and processor 38 may execute operating system 110. An example of system memory 40 can include, but is not limited to, a type of memory usable by a computer, such as random access memory (RAM), read only memory (ROM), tapes, magnetic discs, optical discs, volatile memory, non-volatile memory, and any combination thereof. An example of processor 38 can include, but is not limited to, any processor specially programmed as described herein, including a controller, microcontroller, application specific integrated circuit (ASIC), field programmable gate array (FPGA), system on chip (SoC), or other programmable logic or state machine. Computer device 102 may include any mobile or fixed computer device, which may be connectable to a network. Computer device 102 may be, for example, a computer device such as a desktop or laptop or tablet computer, a server computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

Operating system 110 may include applications 10. Applications 10 may receive an access request 14 to use application 10. For example, a user may select one or more applications 10 to open and/or use on computer device 102. In addition, another application executing on computer device 102 may send an access request 14 to use application 10. In an implementation, upon receiving the access request 14, application 10 may open in a default application layout 11. As such, the selected application layout 28 of application 10 presented on display 36 may be predefined, for example, based on device characteristics, user preference, and/or application settings. For example, if application 10 is opened on a mobile phone, the selected application layout 28 may be by default a mobile phone application layout.

In an implementation, application layout manager 24 may select an application layout 11 to use based on a distance 17 of user 104 from computer device 102. Application layout manager 24 may receive distance information 18 of user 104 from a camera and/or a sensor that may track a user's location with respect to display 36 of computer device 102. The camera and/or sensor may calculate the distance 17 between user 104 and display 36. For example, viewing angle calculator 16 may use an imaging device 32 (e.g., a mobile device camera, laptop camera) and/or sensor 34 (e.g., an infrared (IR) tracker) present on computer device 102 to determine a distance 17 between user 104 and display 36. In addition, viewing angle calculator 16 may also use a sensor and/or camera present with the user, such as a virtual reality head mounted display and/or a mixed reality head mounted display, to infer a distance 17 between the user and display 36. In addition, viewing angle calculator 16 may use a camera installed in an environment in which the user and computer device 102 exists (e.g., a camera and/or a tracker located in a gallery or conference room) to determine a distance 17 between the user and display 36. For example, the cameras in the environment may be in communication with computer device 102 and may transmit the distance 17 between the user and display 36 to computer device 102.

In an implementation, imaging device 32 and/or sensor 34 may identify a primary user of computer device 102 and calculate the distance 17 between the primary user and display 36. For example, if a plurality of individuals 104, 106, 108 are near computer device 102, imaging device 32 and/or sensor 34 may identify user 104 as a primary user of computer device 102 because user 104 is the user closest to computer device 102 and may calculate the distance 17 from computer device 102 to user 104. In addition, if user 104 is interacting with computer device 102, imaging device 32 and/or sensor 34 may identify user 104 as the primary user and calculate the distance 17 from user 104 to computer device 102.

An example use case may include displaying web pages on large TV screens in galleries and/or halls. If the web content supports both mobile and desktop layout, the mobile layout may be a better suited for presentation mode because of less user interface (UI) clutter. In such cases, application layout manager 24 may determine that the distance 17 of users 104, 106, and 108 are far away from the TV screens. As such, the browser on the large TV may load the mobile version of the content based on the input that users are far away from screens.

In another implementation, application layout manager 24 may select an application layout 11 to use based on a viewing angle 22 of a user 104 of computer device 102. The viewing angle 22 of user 104 may be calculated by viewing angle calculator 16.

Viewing angle calculator 16 may receive user distance information 18 that identifies a distance 17 of user 104 from computer device 102. Viewing angle calculator 16 may use the received user distance information 18 (inversely proportional) in combination with a screen size 20 (directly proportional) of display 36 to calculate the viewing angle 22 of user 104 to computer device 102. An example equation for the viewing angle is:

$$\text{viewing angle} = \text{screen size}/\text{distance} * a \text{ constant} \quad (1)$$

where the constant is an integer that may be varied to adjust the granularity of the resulting viewing angle 22. The resulting viewing angle 22 from the equation may be small or large. Since it may be difficult to work with such values, an application may choose to multiply the original values with a constant, thereby returning modified values for the viewing angle 22, which may be more workable for the application. As such, the constant may affect the granularity of modified values. Constants with a higher value may result in more granular and/or spaced out values, and constants with a smaller value may result in less granular and/or condensed values. For example, if original values for the viewing angle are (2, 4, 6) and the constant is 2, the resulting values for the viewing angle may be (4, 8, 12). If the constant is 0.5, the resulting values for the viewing angle may be (1, 2, 3). In addition, the screen size 20 may include the height of display 36.

Figure 2:
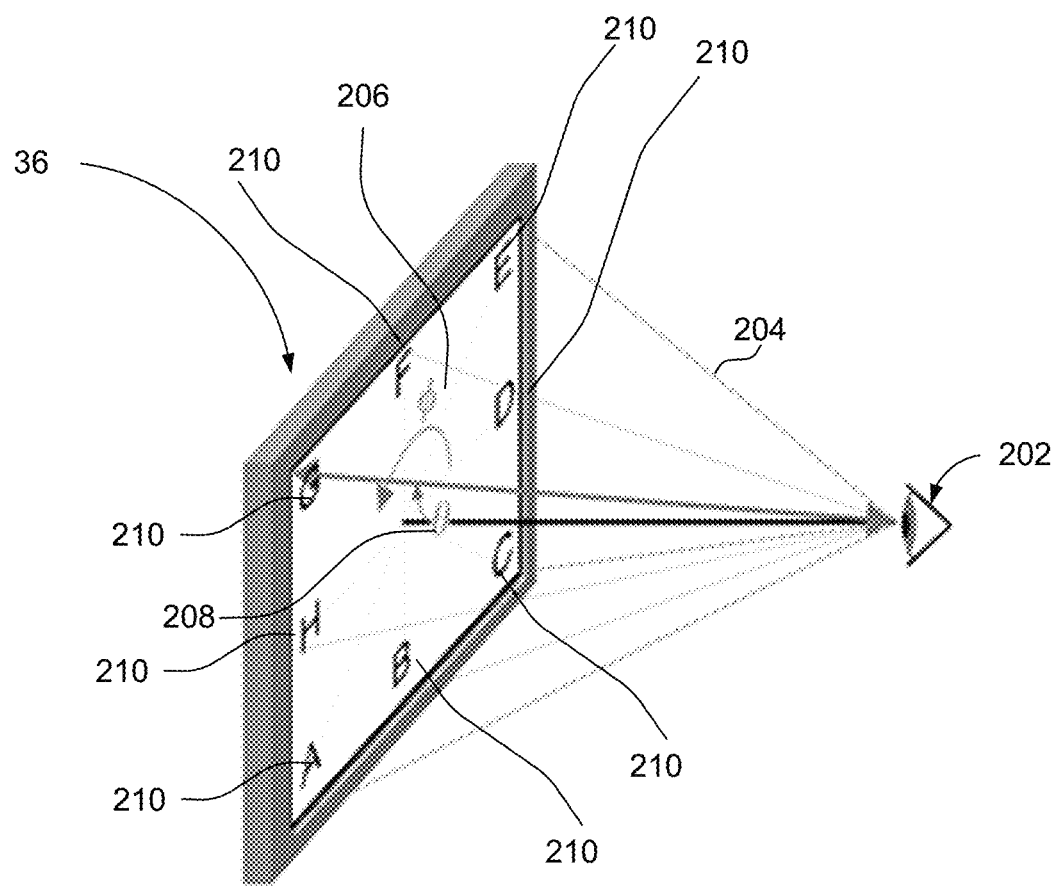
FIG. 2 is an example of different viewing angles when a user looks at a computer device in accordance with an implementation of the present disclosure.

Referring now to FIG. 2, illustrated is an example of viewing angles 22 (FIG. 1) when a user 104 (FIG. 1) looks at display 36 of computer device 102 (FIG. 1). Display 36 may look larger or smaller based on the distance from the viewer, e.g., user 104. In more precise terms, how big objects 210 (e.g., letters A, B, C, D, E, F, G, and H) appear depends on the viewing cone 204, or the viewing angle 206, 208 that objects 210 may cast on the user's eyes 202. The same objects 210, when close by may look bigger because objects 210 may cast a wider viewing angle 206 on the user's eyes 202. When objects 210 are further away, objects 210 may look smaller because objects 210 may cast a smaller viewing angle 208 on the user's eyes 202. Therefore, a laptop or desktop, if kept far away from the viewer would cast the same viewing angle as a mobile phone in a user's hands. This is often the case with monitors which are placed on display in meeting rooms or galleries.

Referring back to FIG. 1, application layout manager 24 may receive the viewing angle 22 of user 104 from viewing angle calculator 16 and may use the viewing angle 22 to determine a selected application layout 28 for application 10 for presentation on display 36. For example, participants usually sit farther away from their screens during video conferencing using Skype, than, say, while drafting an email. Similarly, many users sit in a laid back posture while reading a document, but are much closer to screen when authoring the document. Therefore, maintaining the same user interface layout in such cases may not be optimal. As such, application layout manager 24 may automatically switch to a selected application layout 28 based on a viewing angle 22 of computer device 102 by user 104.

In an implementation, application layout manager 24 may set a viewing angle threshold value 26 for the viewing angle 22 that application layout manager 24 may use in determining whether to switch to a different selected application layout 28. If viewing angle 22 is below the viewing angle threshold value 26, application 10 may switch to a first application layout 12. If the viewing angle 22 is above the viewing angle threshold value 26, application 10 may switch to a second application layout 13. The viewing angle threshold value 26 for the viewing angle may be configurable based on the application and/or user preferences. As such, different applications may have the same and/or different viewing angle threshold values 26.

In an implementation, viewing angle calculator 16 may periodically calculate the viewing angle 22 and application layout manager 24 may compare the viewing angle 22 to the viewing angle threshold value 26 to determine the selected application layout 28 of application 10. For example, the time period for calculating the viewing angle 22 may be short so that the viewing angle calculator 16 affectively calculates the viewing angle 22 continuously.

In another implementation, viewing angle calculator 16 may calculate the viewing angle 22 when a change in the distance 17 between user 104 and display 36 occurs and application layout manager 24 may compare the viewing angle 22 to the viewing angle threshold value 26 to determine the selected application layout 28 of application 10. For example, a distance information data store 30 may store previous user distance information 21. As such, as the distance information 18 is received, the distance 17 may be stored in distance information data store 30. Viewing angle 22 calculator may compare the received user distance information 18 to the previous user distance information 21 to determine whether a change in distance 17 may have occurred. In another implementation, imaging device 32 and/or sensor 34 may determine that a change in distance 17 may have occurred and may notify viewing angle calculator 16 of the new distance 17.

An example use case may include while authoring (e.g., editing) a document, a user generally sits in upright position close to the screen, but when the user is reading the document, the user may choose to sit far from the screen in a laid back posture. The laid back posture generally means that the reader's eyes are farther from the screen and it may be preferable to have larger font size. As such, the user's change in distance from the screen may be used as the basis for switching to a read mode. In addition to increasing font size, the document layout may also change (e.g., zoom-in images, etc.).

In an implementation, application layout manager 24 may use the distance information 18 of user 104 as an input to determine a use 19 of application 10 by user 104. For example, if user 104 is working on a presentation, and user 104 moves far away from display 36 where user 104 is working on the presentation, application 10 may use the distance information 18 of user 104 as an input to infer that user 104 is no longer editing the presentation. As such, application 10 may switch into a presentation mode when user 104 moves far away from display 36 where user 104 was editing the presentation, and application 10 may switch to editing mode when user 104 moves nearby display 36 where the user was editing the presentation.

For example, when a presentation slide is opened in a presentation application in a conference room, instead of opening the presentation in an edit mode (e.g., by default), application 10 may directly launch it in a presentation mode based on the location of audience. If the viewers are far away from the screen, application 10 may determine that the use 19 of application 10 by user 104 is viewing and not authoring the presentation.

Each application 10 and/or user 104 may choose an appropriate behavior for the presentations mode and/or layouts. For example, in a first application layout 12, application 10 may choose to go full screen, increase the font properties of the text, and hide the toolbars. In a second application layout 13, application 10 may choose to go to an author mode and the document may be editable. As such, when user 104 is sitting close to the screen, application 10 may automatically switch to a second application layout 13 (e.g., an author mode) and the document may be editable and the toolbars may be shown. When user 104 is sitting at a distance, application 10 may automatically enter a first application layout 12 (e.g., a full screen mode) and the font properties displayed may change to suit the audience and the toolbars may be hidden.

As such, computer device 102 may have applications 10 automatically switch to an appropriate application layout 11 based on one or more of a viewing angle 22 of computer device 102, a distance 17 user 104 is from computer device 102, and/or preferences of application 10 and/or user 104 to improve the user interface layouts of applications.

Figure 3:
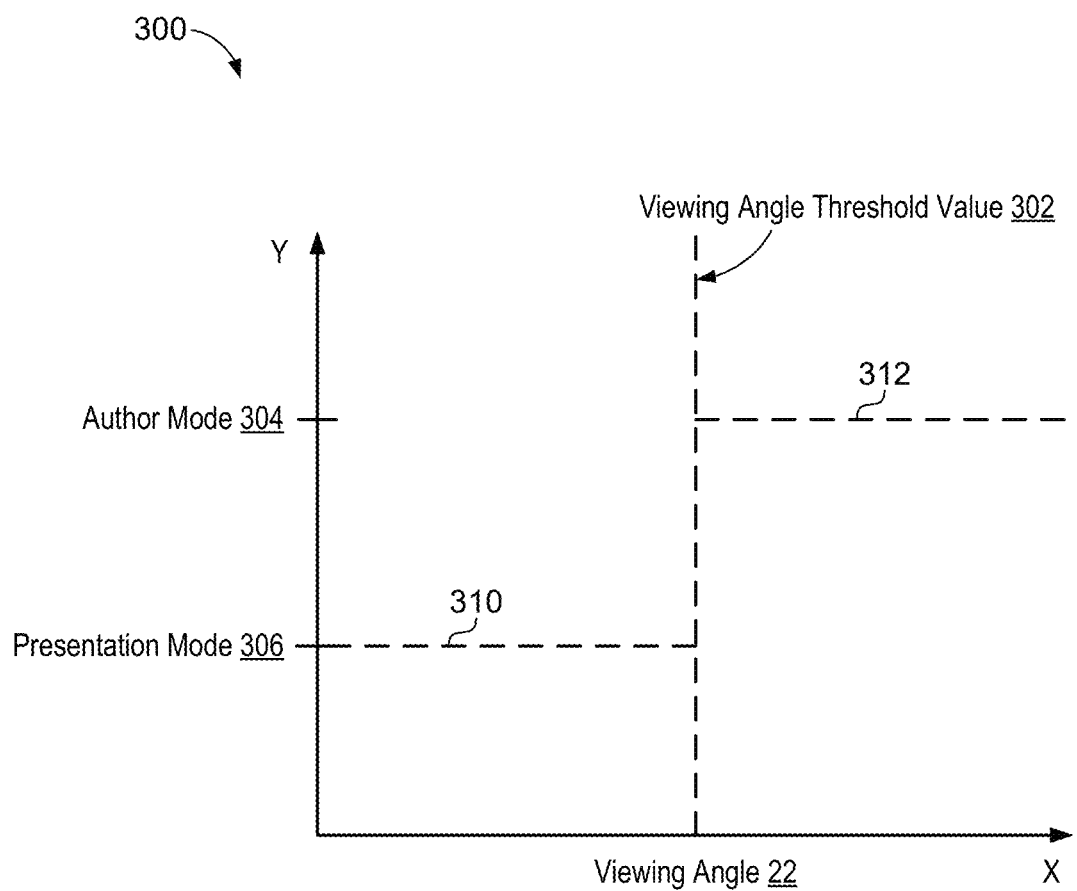
FIG. 3 illustrates an example graph of viewing angles relative to a threshold viewing angle in accordance with an implementation of the present disclosure.

Referring now to FIG. 3, illustrated is an example graph 300 with the viewing angle 22 on the X axis of graph 300 and example application layouts of an author mode 304 and a presentation mode 306 on the Y axis of graph 300. Graph 300 also illustrates the viewing angle threshold value 26. At 310, when the viewing angle 22 is below the viewing angle threshold value 26, application 10 (FIG. 1) may use a presentation mode 306 for presenting application 10 on display 36 (FIG. 1). However, at 312, when the viewing angle 22 is above the viewing angle threshold value 26, application 10 may automatically switch to an author mode 304 for presenting application 10 on display 36.

An example use case may include when user 104 is watching a video on a video player, if user 104 is close to the screen, application layout manager 24 may determine that the viewing angle 22 is above the viewing angle threshold value 26, and the video player may show the controls and settings related to video playback (pause/play/volume controls). If user 104 is sitting far from the screen, application layout manager 24 may determine that the viewing angle 22 is below the viewing angle threshold value 26, and the video player may assume user 104 is watching the video. As such, the video player may hide the control options and turn on the full-screen mode.

Figure 4:
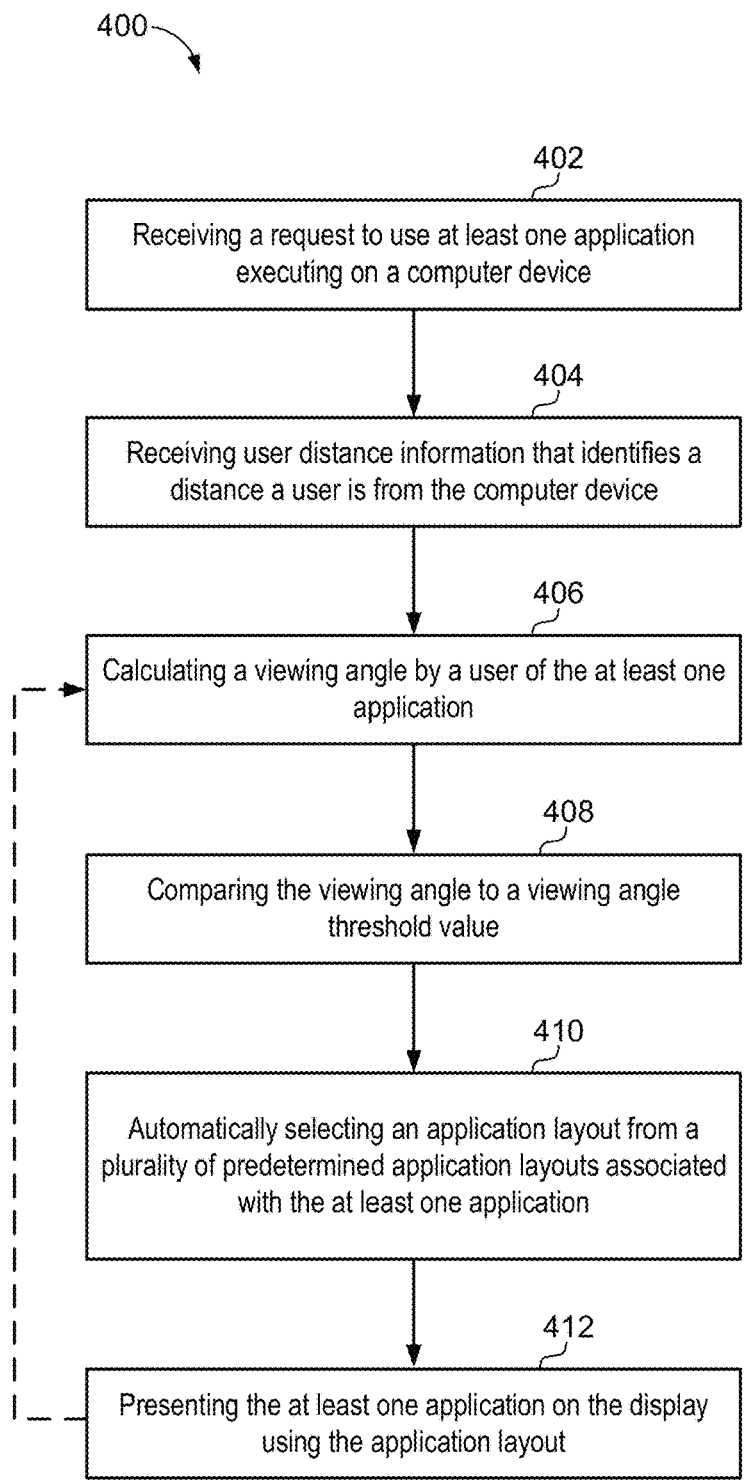
FIG. 4 is an example method flow for selecting an application layout for presentation of an application on a display in accordance with an implementation of the present disclosure.

Referring now to FIG. 4, an example method flow 400 for selecting an application layout 28 (FIG. 1) for presentation of an application 10 (FIG. 1) on a display 36 (FIG. 1) for use with hardware of a computer device 102 (FIG. 1) is discussed in connection with the description of the architecture of FIG. 1.

At 402, method 400 may include receiving a request to use at least one application executing on a computer device. Computer device 102 may include one or more applications 10 that a user 104 may access on computer device 102. For example, operating system 110 may include applications 10. Applications 10 may include a plurality of application layouts 11, such as, a first application layout 12 and a second application layout 13 up to n (where n is an integer) application layouts. The application layouts 11 may define how application 10 may be presented on display 36. For example, the application layouts 11 may modify the font size displayed, an image size, orientation of objects presented, an amount of content presented, a type of content presented, and a presentation mode of the application (e.g., mobile phone mode, full screen in a presentation mode, an editing mode). Applications 10 may receive an access request 14 to use application 10. For example, a user may select one or more applications 10 to open and/or use on computer device 102. In addition, another application executing on computer device 102 may send an access request 14 to use application 10.

At 404, method 400 may include receiving user distance information that identifies a distance a user is from the computer device. Application layout manager 24 may receive distance information 18 of user 104 from a camera and/or a sensor that may track a user's location with respect to display 36 of computer device 102. The camera and/or sensor may calculate the distance 17 between user 104 and display 36. For example, viewing angle calculator 16 may use an imaging device 32 (e.g., a mobile device camera, laptop camera) and/or sensor 34 (e.g., an infrared (IR) tracker) integral to computer device 102 to determine a distance 17 between user 104 and display 36. In addition, viewing angle calculator 16 may also use a sensor and/or camera present with the user, such as a virtual reality head mounted display and/or a mixed reality head mounted display, to infer a distance 17 between the user and display 36. In addition, viewing angle calculator 16 may use a camera installed in an environment in which the user and computer device 102 exists (e.g., a camera and/or a tracker located in a gallery or conference room) to determine a distance 17 between the user and display 36. For example, the cameras in the environment may be in communication with computer device 102 and may transmit the distance 17 between the user and display 36 to computer device 102.

In an implementation, imaging device 32 and/or sensor 34 may identify a primary user of computer device 102 and calculate the distance 17 between the primary user and display 36. For example, if a plurality of individuals 104, 106, 108 are near computer device 102, imaging device 32 and/or sensor 34 may identify user 104 as a primary user of computer device 102 because user 104 is the user closest to computer device 102 and may calculate the distance 17 from computer device 102 to user 104. In addition, if user 104 is interacting with computer device 102, imaging device 32 and/or sensor 34 may identify user 104 as the primary user and calculate the distance 17 from user 104 to computer device 102.

At 406, method 400 may include calculating a viewing angle by a user of the at least one application. The viewing angle 22 of user 104 may be calculated by viewing angle calculator 16. Viewing angle calculator 16 may receive user distance information 18 that identifies a distance 17 of user 104 from computer device 102. Viewing angle calculator 16 may use the received user distance information 18 (inversely proportional) in combination with a screen size 20 (directly proportional) of display 36 to calculate the viewing angle 22 of user 104 to computer device 102. The screen size 20 may include the height of display 36. An example equation for calculating the viewing angle 22 is provided in the description of FIG. 1.

At 408, method 400 may include comparing the viewing angle to a viewing angle threshold value, and at 410, method 400 may include automatically selecting an application layout from a plurality of predetermined application layouts associated with the at least one application. Different applications may have the same and/or different predetermined application layouts. For example, application layout manager 24 may select the application layout 28 from a plurality of predetermined application layouts 11 associated with application 10 based at least on the comparison of the viewing angle 22 to the viewing angle threshold value 26 and a determined use 19 of application 10 by user 104. Application layout manager 24 may receive the viewing angle 22 of user 104 from viewing angle calculator 16 and may use the viewing angle 22 to determine a selected application layout 28 for application 10 for presentation on display 36. In an implementation, application layout manager 24 may set a viewing angle threshold value 26 for the viewing angle 22 that application layout manager 24 may use in determining whether to switch to a different selected application layout 28. For example, if viewing angle 22 is below the viewing angle threshold value 26, application 10 may switch to a first application layout 12. If the viewing angle 22 is above the viewing angle threshold value 26, application 10 may switch to a second application layout 13. The viewing angle threshold value 26 for the viewing angle may be configurable based on the application and/or user preferences. As such, different applications may have the same and/or different viewing angle threshold values 26.

For example, participants usually sit farther away from their screens during video conferencing using Skype, than, say, while drafting an email. Similarly, many users sit in a laid back posture while reading a document, but are much closer to screen when authoring the document. Therefore, maintaining the same user interface layout in such cases may not be optimal. As such, application layout manager 24 may automatically switch to a selected application layout 28 based on a viewing angle 22 of computer device 102 by user 104.

In an implementation, viewing angle calculator 16 may periodically calculate the viewing angle 22 and application layout manager 24 may compare the viewing angle 22 to the viewing angle threshold value 26 to determine the selected application layout 28 of application 10.

In another implementation, viewing angle calculator 16 may calculate the viewing angle 22 when a change in the distance 17 between user 104 and display 36 occurs and application layout manager 24 may compare the viewing angle 22 to the viewing angle threshold value 26 to determine the selected application layout 28 of application 10. For example, a distance information data store 30 may store previous user distance information 21. As such, as the distance information 18 is received, the distance 17 may be stored in distance information data store 30. Viewing angle 22 calculator may compare the received user distance information 18 to the previous user distance information 21 to determine whether a change in distance 17 may have occurred. In another implementation, imaging device 32 and/or sensor 34 may determine that a change in distance 17 may have occurred and may notify viewing angle calculator 16 of the new distance 17.

In another implementation, application layout manager 24 may select an application layout 11 to use based on a distance 17 of user 104 from computer device 102 and/or a change in distance 17 of user 104 from computer device 102. Application layout manager 24 may receive distance information 18 of user 104 from a camera and/or a sensor that may track a user's location with respect to display 36 of computer device 102. An example use case may include displaying web pages on large TV screens in galleries and/or halls. If the web content supports both mobile and desktop layout, the mobile layout may be a better suited for presentation mode because of less user interface (UI) clutter. In such cases, application layout manager 24 may determine that the distance 17 of users 104, 106, and 108 are far away from the TV screens. As such, the browser on the large TV may load the mobile version of the content based on the input that users are far away from screens.

In an implementation, application layout manager 24 may use the distance information 18 of user 104 as an input to determine a use 19 of application 10 by user 104. For example, if user 104 is working on a presentation, and user 104 moves far away from display 36 where user 104 is working on the presentation, application 10 may use the distance information 18 of user 104 as an input to infer that user 104 is no longer editing the presentation. As such, application 10 may switch into a presentation mode when user 104 moves far away from display 36 where user 104 was editing the presentation, and application 10 may switch to editing mode when user 104 moves nearby display 36 where the user was editing the presentation.

For example, when a presentation slide is opened in a presentation application in a conference room, instead of opening the presentation in an edit mode (e.g., by default), application 10 may directly launch it in a presentation mode based on the location of audience. If the viewers are far away from the screen, application 10 may determine that the use 19 of application 10 by user 104 is viewing and not authoring the presentation.

At 412, method 400 may include presenting the at least one application on the display using the application layout. For example, application layout manager 24 may present the selected application layout 28 on display 36. The selected application layout 28 may define how application 10 may be presented on display 36. For example, the selected application layout 28 may modify an orientation of objects in the UI from horizontal to vertical. For example, a news article shown in multiple columns (where columns are placed side by side horizontally), may collapse into a single vertical column. A multiple column layout may be beneficial when the viewing angle 22 is large (e.g., a desktop) whereas a single column layout may be beneficial when the viewing angle 22 is small (e.g., a mobile device). Another example may include changing an amount of content presented to user 104. For example, only headings may be displayed when user 104 is far away from computer device 102 (e.g., in a presentation mode), and additional content may be revealed when user 104 walks towards the display (e.g., a reading mode).

As such, computer device 102 may have applications 10 automatically switch to an appropriate application layout 11 based on one or more of a viewing angle 22 of computer device 102, a distance 17 user 104 is from computer device 102, and/or preferences of application 10 and/or user 104 to improve the user interface layouts of applications.

Figure 5:
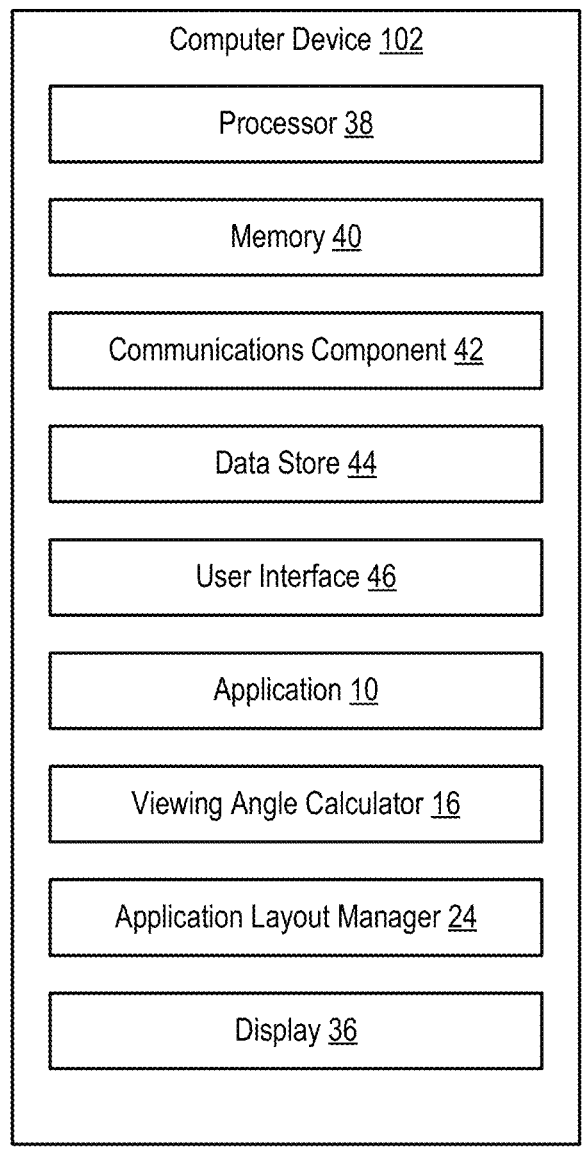
FIG. 5 is a schematic block diagram of an example device in accordance with an implementation of the present disclosure.

Referring now to FIG. 5, illustrated is an example computer device 102 in accordance with an implementation, including additional component details as compared to FIG. 1. In one example, computer device 102 may include processor 38 for carrying out processing functions associated with one or more of components and functions described herein. Processor 38 can include a single or multiple set of processors or multi-core processors. Moreover, processor 38 can be implemented as an integrated processing system and/or a distributed processing system.

Computer device 102 may further include memory 40, such as for storing local versions of applications being executed by processor 38. Memory 40 can include a type of memory usable by a computer, such as random access memory (RAM), read only memory (ROM), tapes, magnetic discs, optical discs, volatile memory, non-volatile memory, and any combination thereof. Additionally, processor 38 and memory 40 may include and execute operating system 110 (FIG. 1).

Further, computer device 102 may include a communications component 42 that provides for establishing and maintaining communications with one or more parties utilizing hardware, software, and services as described herein. Communications component 42 may carry communications between components on computer device 102, as well as between computer device 102 and external devices, such as devices located across a communications network and/or devices serially or locally connected to computer device 102. For example, communications component 42 may include one or more buses, and may further include transmit chain components and receive chain components associated with a transmitter and receiver, respectively, operable for interfacing with external devices.

Additionally, computer device 102 may include a data store 44, which can be any suitable combination of hardware and/or software, that provides for mass storage of information, databases, and programs employed in connection with implementations described herein. For example, data store 44 may be a data repository for applications 10 (FIG. 1), viewing angle calculator 16 (FIG. 1), application layout manager 24 (FIG. 1), and/or display 36 (FIG. 1).

Computer device 102 may also include a user interface component 50 operable to receive inputs from a user of computer device 102 and further operable to generate outputs for presentation to the user. User interface component 46 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 46 may include one or more output devices, including but not limited to a display, a speaker, a haptic feedback mechanism, a printer, any other mechanism capable of presenting an output to a user, or any combination thereof.

In an implementation, user interface component 46 may transmit and/or receive messages corresponding to the operation of applications 10, viewing angle calculator 16, application layout manager 24, and/or display 36. In addition, processor 38 executes applications 10, viewing angle calculator 16, application layout manager 24, and/or display 36 and memory 40 or data store 48 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
    a memory to store data and instructions;
    a processor in communication with the memory;
    a display;
    an operating system in communication with the memory and the processor, wherein the operating system is operable to:
        receive a request to use at least one application executing on the computer device;
        receive user distance information that identifies a distance a user is from the computer device;
        calculate a viewing angle by a user of the at least one application based at least upon a screen size of the display and the user distance information;
        compare the viewing angle to a viewing angle threshold value;
        automatically select an application layout from a plurality of predetermined application layouts associated with the at least one application based at least on comparing of the viewing angle to the viewing angle threshold value and a determined use of the at least one application by the user, wherein the selected application layout is an editing mode layout that allows the user to make a modification to content of the at least one application in response to the user distance information indicating a first distance, and the selected application layout is a mobile layout or a presentation mode layout in response to the user distance information indicating a second distance greater than the first distance; and
        present the at least one application on the display using the selected application layout.

2. The computer device of claim 1, wherein the operating system is further operable to select the application layout by:
    automatically using the editing mode layout when the viewing angle is below the viewing angle threshold value; and
    automatically using the mobile layout or the presentation mode layout when the viewing angle is above the viewing angle threshold value.

3. The computer device of claim 1, wherein the operating system is further operable to determine the use of the at least one application based at least upon the distance of the user from the computer device.

4. The computer device of claim 1, wherein the operating system is operable to receive the user distance information from one or more of an imaging device or a sensor integral to the computer device.

5. The computer device of claim 1, wherein the operating system is operable to receive the user distance information from one or more of an imaging device or a sensor separate from the computer device in an environment surrounding the computer device.

6. The computer device of claim 1, wherein the operating system is operable to receive the user distance information from at least one of an imaging device or a sensor on a head mounted display.

7. The computer device of claim 1, wherein the operating system is operable to periodically calculate the viewing angle.

8. The computer device of claim 1, wherein the operating system is operable to:
    calculate a new viewing angle when a change in the user distance information occurs; and
    select a different application layout based at least on comparing of the new viewing angle to the viewing angle threshold value.

9. The computer device of claim 1, wherein the viewing angle threshold value is configurable based on preferences of one or more of the at least one application and the user.

10. The computer device of claim 1, wherein a different application layout is selected when a change in the distance of the user from the computer device occurs.

11. A method for selecting an application layout for presentation of an application on a display of a computer device, comprising:

receiving, at an operating system executing on the computer device, a request to use at least one application executing on the computer device;

receiving user distance information that identifies a distance a user is from the computer device;

calculating a viewing angle by a user of the at least one application based at least upon a screen size of the display and the user distance information;

comparing the viewing angle to a viewing angle threshold value;

automatically selecting an application layout from a plurality of predetermined application layouts associated with the at least one application based at least on comparing of the viewing angle to the viewing angle threshold value and a determined use of the at least one application by the user, wherein the selected application layout is an editing mode layout that allows the user to make a modification to content of the at least one application in response to the user distance information Indicating a first distance, and the selected application layout is a mobile layout or a presentation mode layout in response to the user distance information indicating a second distance greater than the first distance; and presenting the at least one application on the display using the selected application layout.

12. The method of claim 11, wherein automatically selecting the application layout further comprises:

automatically using the editing mode layout when the viewing angle is below the viewing angle threshold value; and automatically using the mobile layout or the presentation mode layout when the viewing angle is above the viewing angle threshold value.

13. The method of claim 11, wherein the use of the at least one application by the user is determined based at least upon the distance of the user from the computer device.

14. The method of claim 11, wherein the user distance information is received from one or more of an imaging device or a sensor integral to the computer device.

15. The method of claim 11, wherein the user distance information is received from one or more of an imaging device or a sensor separate from the computer device in an environment surrounding the computer device.

16. The method of claim 11, wherein the user distance information is received from at least one of an imaging device or a sensor on a head mounted display.

17. The method of claim 11, wherein the viewing angle is periodically calculated.

18. The method of claim 11, further comprising:

calculating a new viewing angle when a change in the user distance information occurs; and selecting a different application layout based at least on comparing of the new viewing angle to the viewing angle threshold value.

19. The method of claim 11, wherein the viewing angle threshold value is configurable based on preferences of one or more of the at least one application and the user.

20. The method of claim 11, wherein presenting using the selected application layout includes one or more of modifying an orientation of objects presented, modifying a type of content presented, or modifying an orientation of columns presented.

21. The method of claim 11, further comprising:

determining the determined use of the at least one application from one or more predetermined uses associated with the at least one application based at least upon the user distance information.

22. The method of claim 11, wherein other applications use a different viewing angle threshold from the viewing angle threshold value used for the at least one application.

23. The method of claim 11, wherein the user is selected from a plurality of users near the computer device in response to the user interacting with the computer device or the user being closest to the computer device relative to other users of the plurality of users.

24. A non-transitory computer-readable medium storing instructions executable by a computer device, comprising:

at least one instruction for causing the computer device to receive a request to use at least one application executing on the computer device;

at least one instruction for causing the computer device to receive user distance information that identifies a distance a user is from the computer device;

at least one instruction for causing the computer device to calculate a viewing angle by a user of the at least one application based at least upon a screen size of a display and the user distance information;

at least one instruction for causing the computer device to compare the viewing angle to a viewing angle threshold value;

at least one Instruction for causing the computer device to automatically select an application layout from a plurality of predetermined application layouts associated with the at least one application based at least on comparing of the viewing angle to the viewing angle threshold value and a determined use of the at least one application by the user, wherein the selected application layout is an editing mode layout that allows the user to make a modification to content of the at least one application in response to the user distance information indicating a first distance, and the selected application layout is a mobile layout or a presentation mode layout in response to the user distance information indicating a second distance greater than the first distance; and at least one instruction for causing the computer device to present the at least one application on the display using the selected application layout.

* * * * *